United States Patent Office 3,398,625
Patented Aug. 27, 1968

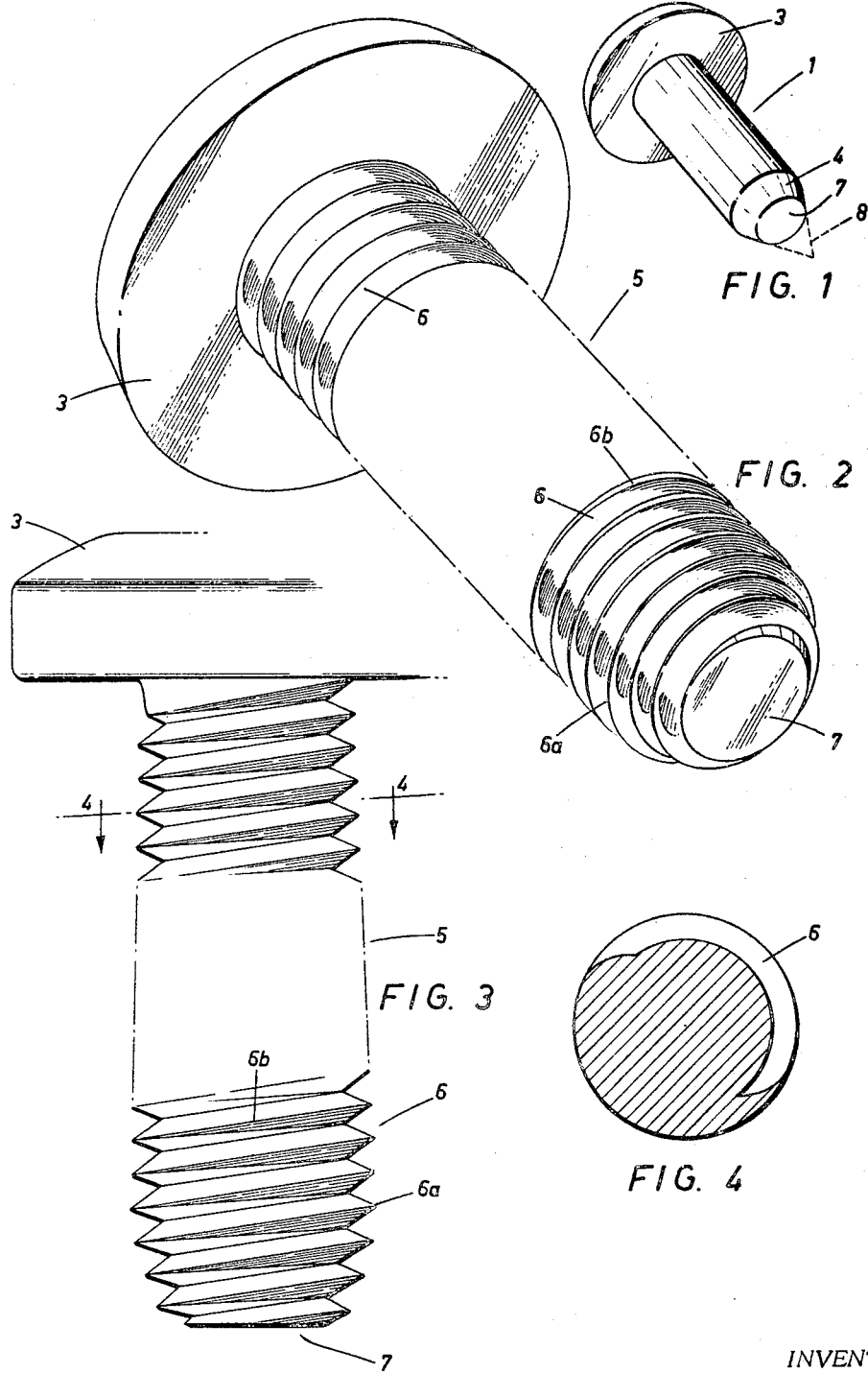

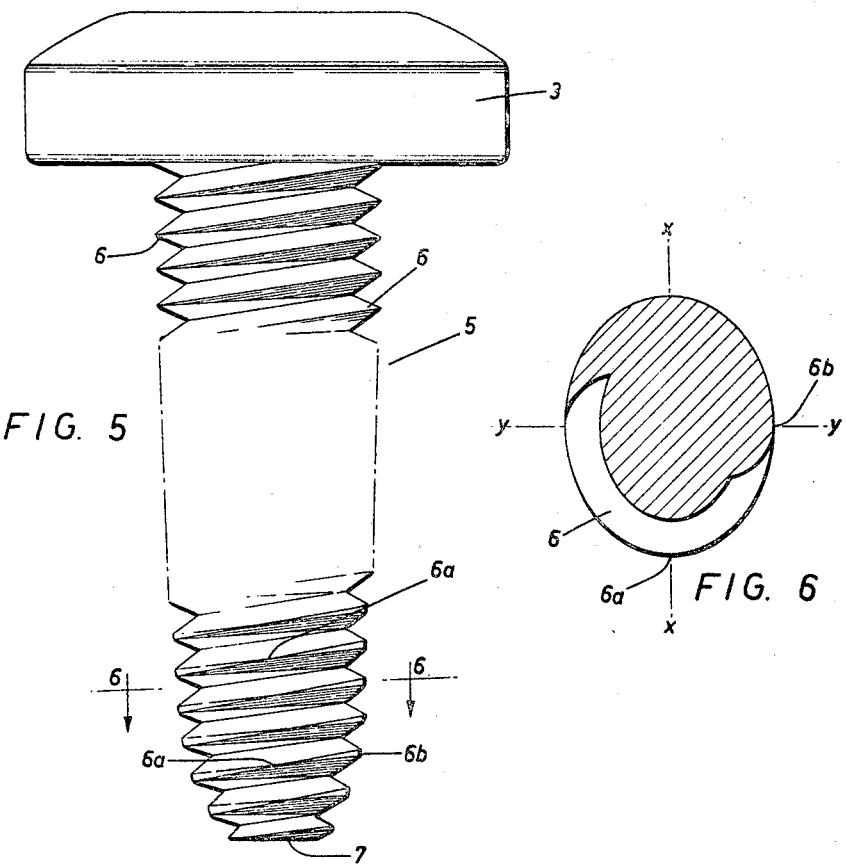
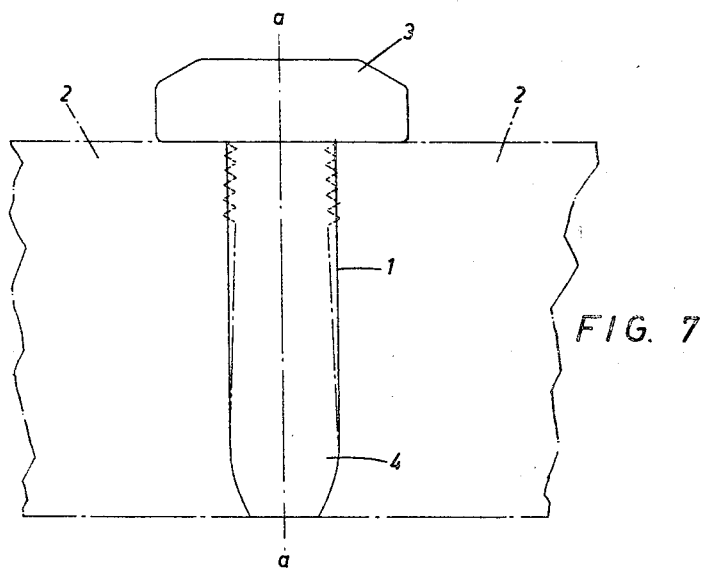

3,398,625
SELF-TAPPING SCREW
Carl Herman Ansingh, Milton, Ontario, Canada, assignor to P. L. Robertson Mfg. Co. Limited, Milton, Ontario, Canada
Filed Oct. 22, 1965, Ser. No. 500,922
4 Claims. (Cl. 85—46)

ABSTRACT OF THE DISCLOSURE

A screw having a threaded shank terminating in a reduced lower end and having an elliptical cross section portion above the reduced lower end, a circular cross section portion adjacent the head, and a smoothly and continuously progressing transition portion between the circular and elliptical portions, the threads in the elliptical portion being relatively deeper and more sharply crested at the ends of the major axis thereof than at the ends of the minor axis, and the threads in the circular portion being sharply crested and uniform in depth, the maximum major dimension of the lower elliptical shank portion, transverse the screw axis being greater than the diameter of the circular portion.

---

This invention relates to screws of the type which are adapted to be threaded into untapped holes, and the object of the invention is to provide a screw which can be driven into untapped holes with greater facility and less driving torque than previous screws of this type.

Another important object is to provide a screw as aforesaid which can be driven with a minimum requirement of driving torque into a blind hole provided for example, in structural and lower carbon content steel members, zinc or aluminum die castings, or brass or bronze forgings or the like, and which will swage form a thread formation on the wall of the untapped hole without chipping of the wall surface so that the screw can be run clear to the bottom of the hole.

Still another and important object is to provide a screw as aforesaid which will be self-locking against removal unless deliberately removed with a driver. In this connection, one important application of the invention is to provide a screw for holding two members together without requiring the use of a nut, the screw passing through a clearance hole in the upper member and entering an untapped hole in the lower member to swage form threads therein in a manner to provide a self-locking action.

The principal feature of the invention resides in providing a screw, the lower portion or lower end of the body or shank of which is out of round, preferably elliptical, in cross section and the upper portion beneath the head is circular in cross section with the diameter of the circle being slightly smaller than the major lateral dimension of the lower portion, e.g. slightly smaller than the major axis of the lower portion when same is elliptical. With this formation the threads of the lower portion of the screw present deep, sharp plowing edges at opposite sides of the screw at the ends of the major lateral dimension, viz at the ends of the major axis of the elliptical cross section and relatively large relief areas formed by shallower, broader plowing edges in between such sharp plowing edges whereby the material of the wall surface of the hole can be progressively displaced or swaged by the lower screw portion into thread form with the relief areas providing sufficient relief so that the swaging action can take place without chipping. Since the upper crcular cross sectioned portion of the screw has a slightly smaller diameter than for example, the major axis of the elliptical portion, at the ends of which the sharp plowing edges of the lower portion of the screw occur, the female threads formed in the wall surface of the hole by virtue of such plowing edges will be of slightly larger diameter than the circular male threads on the upper portion of the screw. Thus, as a result of this thread clearance, the screw can be driven deep into the hole with a low running or driving torque. It will also be understood that any tendency of the metal of the wall surface to flow axially towards the screw head to fill in behind the advancing lower end of the screw will be such that it will not interfere with the free running of the reduced outer dimensioned upper screw portion but will provide a positive locking of the screw against accidental removal.

These and other objects and features will become apparent from the following detailed description taken in conjunction with the accompanying drawings in which:

FIGURE 1 is a perspective view of a blank from which a screw of the present invention may be formed, the dotted point indicating that the blank may have either a blunt point or a relatively sharp point.

FIGURE 2 is a perspective view of a screw embodying the invention produced from the blank of FIGURE 1.

FIGURE 3 is an elevational view partly broken away with the minor axis of the elliptical lower portion of the screw perpendicular to and the major axis lying in the plane of the paper.

FIGURE 4 is a cross section on the line 4—4 taken through the circular upper portion of the screw.

FIGURE 5 is a view similar to FIGURE 3 with the minor axis of the elliptical lower portion of the screw parallel and the major axis perpendicular to the plane of the paper.

FIGURE 6 is a vertical cross sectional view taken on the line 6—6 of FIGURE 5.

FIGURE 7 is a broken away and elevational view showing the blank of FIGURE 1 about to be rolled between a pair of dies in the forming of the screw of FIGURE 2.

With reference to FIGURES 1 and 7 the screws of the present invention is formed from an out of round blank 1 which is preferably of elliptical cross section by rolling between a pair of conventional flat machine thread rolling dies 2 indicated in FIGURE 7, the dies preferably being inclined to the axis $a$—$a$ of the screw at an angle of from about ½° to 1½° whereby the dies are closer together and are adapted to squeeze the blank more adjacent to the head 3 than at the lower end of the blank 4 in the production of the screw 5 shown in FIGURES 2 to 6.

As a result of such rolling the lower end portion of the screw 5 is of elliptical cross section as best seen in FIGURE 6 with the portions 6$a$ of the threads, generally designated at 6, at the end of the major axis $x$—$x$ of the ellipse having a greater depth from the root to the crest than the thread portions 6$b$ at the minor axis of the ellipse $y$—$y$. Further as will be seen by comparing FIGURES 3 and 5 the thread portions 6$a$ at the ends of the major elliptical axis $x$—$x$ terminate as sharply edged plows at opposite sides of the screw (FIGURE 3) while the threads 6$b$ at the minor elliptical axis $y$—$y$ terminate in relatively flat crests (FIGURE 5) with the radial distance from the screw axis $a$—$a$, to the flat crests of the thread portions 6$b$ being less than the radial distance to the sharply edged thread portions 6$a$.

This effect is achieved in rolling by having the rolling dies 2 spaced apart sufficiently at the lower end of the blank so that there is sufficient metal at the major axis of the blank to flow and completely fill the thread grooves of the die to form the sharply crested threads, whereas at the minor axis there is not sufficient metal to form complete sharply crested threads.

At the upper end of the screw 5 adjacent to the head 3, threads 6 are of uniform configuration and circular in cross section as will be seen from FIGURE 4. This effect is achieved by having the dies closer together adjacent to the head of the screw whereby in the rolling operation sufficient metal is displaced to cause filling of the die grooves at all points around the blank so that the elliptical blank configuration is transformed into a circularly threaded screw portion with all threads terminating in sharp edges whose radial distance from the screw axis a—a is less than the radial distance out to the thread portions 6a as seen from FIGURE 3 and whose radial distance from said axis a—a may be greater than the radial distance out to the thread portions 6b as shown in FIGURE 5.

It will be understood that there will be a progressive change along the screw axis in moving from the elliptical lower portion of the screw depicted in FIGURE 6 to the circular portion of the screw depicted in FIGURE 4.

While the screw has been shown as having the threads 6 running right to the head thereof these threads may terminate short of the head if desired.

Also, while the screw has been shown as having a blunt pointed portion 7 carrying the threads 6, it will be understood the invention is applicable to screws having any shape of pointed portion such as a pyramidal conical, or blunt point with or without threads. FIGURE 1 shows in dotted lines at 8 a blank having a pinch pointed end that could be used to produce a screw having an extended unthreaded point when rolled between the dies 2.

The head 3 of the screw may, of course, be provided with any suitable tool engaging socket or slot (not shown) or may be of other than round shape, for example, hexagonal, to be engaged by a suitable tool.

After rolling, the screw 5 may be hardened in any conventional manner as for instance by heat treating to any desired hardness depending upon the nature of the material into which it is intended to be inserted.

In driving a screw according to the invention into an untapped hole, it will be appreciated that the sharp plowing thread portions 6a at the lower end of the screw will act at opposite sides of the hole over a limited area to provide a swaging action to form female threads in the hole wall, with the thread portions 6b providing relief areas between the thread portions 6a. This arrangement allows for sufficient metal flow whereby the thread swaging and forming action on the hole wall can be carried out without requiring that excessive torque be applied to the screw and without giving rise to metal break off or chipping.

Once the threads have been formed in the hole wall by the elliptical lower end of the screw, it will be appreciated that the diameter of these threads will be slightly larger than the diameter of the circular cross section of the upper portion of the screw and the screw will therefore have a low running torque. Also, it will be appreciated that any tendency of the metal of the wall of the hole to back fill behind the advancing lower end of the screw will not be sufficient to adversely affect the running torque required to advance the circular portion of the screw into the hole but will tend to block removal of the lower end of the screw whose major axis will be greater than the diameter of the circular screw portion.

To illustrate the reduction in torque required to drive the screw of the invention 10–12 inch lbs. were needed as compared with a range of 17–36 inch lbs. needed with other types of screws, while the running torque was as low as 2–4 inch lbs.

While the screw illustrated has a single thread, it will be appreciated it may be provided with for example, double threads and such variations may be made without departing from the spirit of the invention or scope of the appended claims.

I claim:

1. A screw comprising a head and a threaded shank characterized by having a lower portion of the shank of elliptical cross section and an upper portion of the shank of generally circular cross section, the out of round cross section shank portion progressively and smoothly merging into the round cross section portion and, the maximum major dimension of the lower out of round cross section shank portion in a direction transverse the screw axis being greater than the diameter of the circular cross section shank portion said elliptical cross section lower shank portion has relatively deeper and more sharply crested threads at the ends of the major axis thereof than at the ends of the minor axis thereof.

2. A screw as claimed in claim 1 in which the threads of the upper portion of said shank are uniform in depth and shape around the screw.

3. A screw as claimed in claim 1 in which the diameter of said circular cross sectioned upper screw portion is greater than the minor diameter of said elliptical cross sectioned lower end.

4. A screw comprising a head and a threaded shank terminating in a reduced lower end, said threaded shank having an elliptical cross section portion above said reduced lower end and a circular cross section portion adjacent said head, the shank portion between said elliptical and circular shank portions providing a smooth and continuous progression from said elliptical to round cross section, the threads in said elliptically cross section portion being relatively deeper and more sharply crested at the ends of the major axis thereof than at the ends of the minor axis thereof, the threads in said circular cross section portion being uniform in depth and sharply crested, and the threads in said shank portion between said elliptical and circular shank portions progressively becoming more uniform in depth around the screw until said circular portion is reached, the maximum major dimension of the lower elliptical shank portion in a direction transverse the screw axis being greater than the diameter of the circular cross section shank portion.

References Cited

UNITED STATES PATENTS

| 2,414,870 | 1/1947 | Harding | 151—22 |
| 3,192,819 | 7/1965 | Hanneman | 85—47 |
| 3,246,556 | 4/1966 | Phipard | 85—46 |
| 3,258,797 | 7/1966 | Budd | 85—46 |

FOREIGN PATENTS 204,582  8/1939  Switzerland.

MARION PARSONS, Jr., *Primary Examiner.*